Oct. 21, 1924.

H. A. WHITESIDE

CAMERA

Filed March 8, 1920    2 Sheets-Sheet 1

1,512,514

INVENTOR
H. A. Whiteside
BY
Dull, Warfield Dull
ATTORNEY

Oct. 21, 1924.

H. A. WHITESIDE

CAMERA

Filed March 8, 1920

INVENTOR
H. A. Whiteside
BY
Drull, Warfield & Drull
ATTORNEY

Patented Oct. 21, 1924.

1,512,514

UNITED STATES PATENT OFFICE.

HOWARD A. WHITESIDE, OF NEW YORK, N. Y.

CAMERA.

Application filed March 8, 1920. Serial No. 363,959.

*To all whom it may concern:*

Be it known that I, HOWARD A. WHITESIDE, a citizen of the United States, residing at New York, in the county of New York and State of New York, have invented certain new and useful Improvements in Cameras, of which the following is a full, clear, and exact description, such as will enable others skilled in the art to which it appertains to make and use the same.

This invention relates to cameras, and more particularly in some of its details to that type of camera employing a curtain shutter.

It is an object of the invention to provide an improved shutter of the class mentioned which gives a uniform length of exposure throughout the entire sensitized area of the plate or film.

It is a further object to provide an improved curtain shutter which is disposed adjacent the lens of the camera.

It is a further object to provide an improved means to prevent fogging of the plate while the shutter is being set.

It is a further object to provide a novel automatic means for closing the diaphragm when the shutter is being set and to open the same as the shutter reaches its set position.

It is a further object to provide a shutter with improved means for making adjustments for different characters of exposures.

It is a further object to provide a simple, durable and novel shutter which is inexpensive to manufacture and reliable in operation.

Another object is to provide an improved diaphragm of the iris type.

Other objects will be in part obvious and in part pointed out hereinafter in connection with the detailed description.

The invention accordingly consists in the features of construction, combinations of elements and arrangement of parts which will be exemplified in the construction hereinafter set forth, and the scope of the application of which will be indicated in the following claims.

In the accompanying drawings in which an illustrative but preferred embodiment of the invention is shown—

Figure 1:
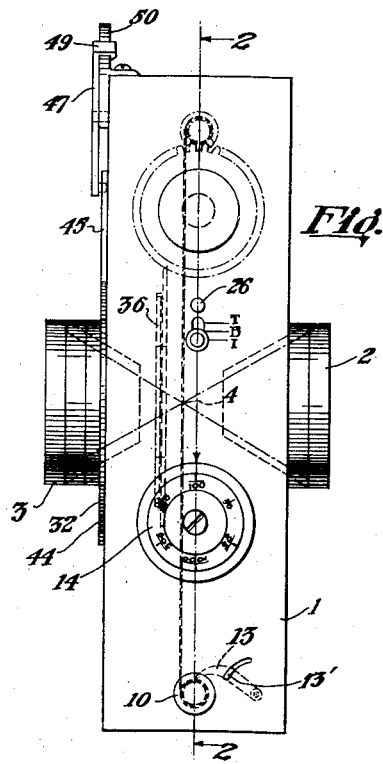
Figure 1 is a side elevation of a camera unit carrying the lens and equipped with the invention.

In commercial forms of high grade camera equipments now in use employing that type of shutter disposed adjacent the lens, the shutter opens first and closes last at the center so that the length of exposure is not uniform over the entire sensitized area of the plate or film, and the best results by such means are therefore not obtainable. According to the improved type of shutter described in this specification, a curtain is provided with a slit which is movable adjacent the lens so that all portions of the diaphragm opening are exposed to the light rays for the same length of time, and the plate is thus evenly exposed throughout its area.

Referring now to the drawing for a detail description of the invention, the unit carrying the lens, shutter, and control apparatus for the same is designated generally by the reference numeral 1 and has exterior walls 1ª and an interior wall or partition 1ᵇ spaced from one of the walls 1ª and forming a compartment 1ᶜ for housing certain of the operating parts. This unit which may be conveniently mounted in the camera frame is fitted with a double lens having a front element or cell 2 and a rear element or cell 3 spaced from each other and arranged so that the refracted light rays passing through the lens may cross in a plane parallel to the front wall of the unit and lying near the mid-position between the lens cells as indicated at 4 in Fig. 1.

Figure 2:
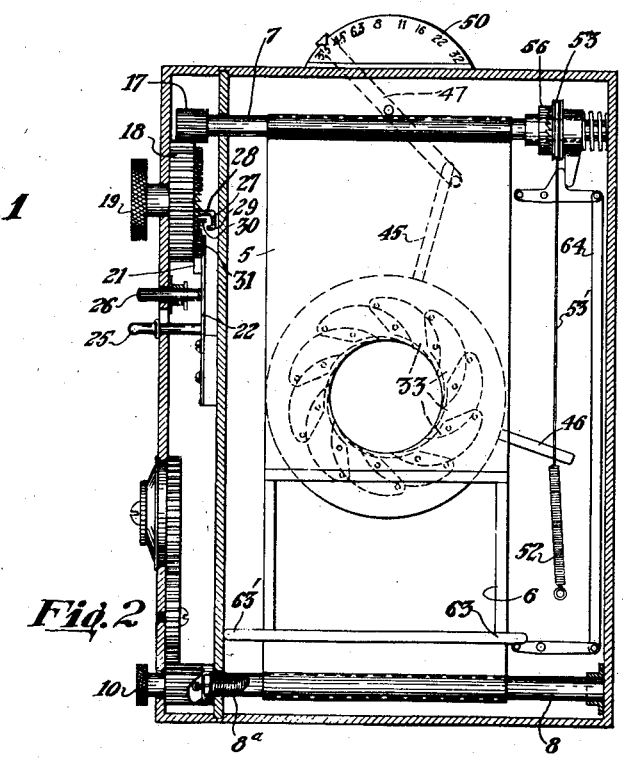
Fig. 2 is a cross-sectional view on the line 2—2 of Fig. 1 looking in the direction of the arrow.

Arranged so as to lie in the plane 4 is a curtain shutter 5 having a slit 6 therein, the shutter being mounted on rollers 7 and 8 rotatably mounted in suitable bearings at opposite sides of the unit 1. The roller 8 has mounted therein a spring 8ª which may be similar to the well-known curtain spring, one end being attached to the roller and the other end to tension adjusting means, as shown in Fig. 2, said spring being tensioned to tend to cause the roller 8 to turn to wind the curtain thereon. This tension adjusting device comprises a member 9 rotatably mounted in the unit 1 in axial alignment with roller 8 and having a nurled winding head 10, a toothed gear 11 and a ratchet wheel 12 thereon. The ratchet wheel 12 is adapted to be engaged by a dog 13 pivotally mounted adjacent thereto and having a laterally extending operating projection 13' extending through a slot in the casing, this dog being adapted to lock the member 9 in adjusted position against the tension of the spring.

In order that the operator may be apprised of the adjustment of the roller spring an indicating dial 14 is provided which is operatively connected to the gear 11 through toothed gears 15 and 16.

The roller 7 is fitted at one end with a toothed gear 17 meshing with a larger gear 18 adapted to be rotated by means of a nurled winding head 19, the gear 18 having a series of inclined teeth 20 disposed on the side thereof for engaging a pawl 21 which is mounted on a spring arm 22. This spring arm is mounted on the partition 1ᵇ by means of screws 23 passing through elongated slots 24 in the arm so that the latter is longitudinally adjustable, an operating pin 25 being secured thereto and extending in a slot in the wall 1ª for this purpose. A longitudinally movable releasing pin 26 is also mounted in suitable bearings in the wall 1ª and is adapted to be projected inwardly to contact spring arm 22.

Figure 5:
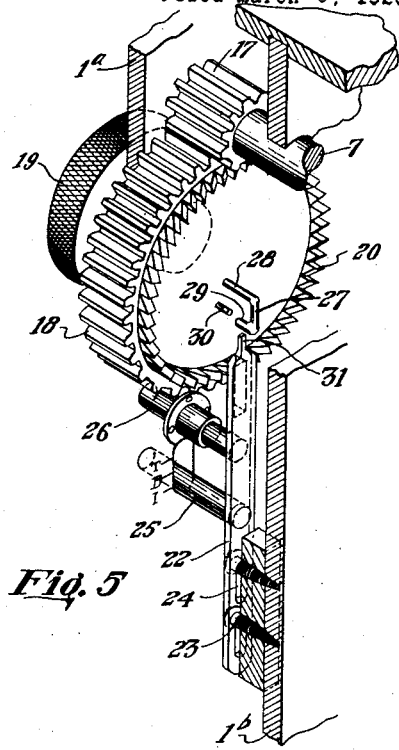
Fig. 5 is a fragmentary enlarged perspective view showing the means for adjusting the shutter for different character of exposures.

Mounted on the face of gear 18, as particularly shown in Figs. 2 and 5, there is a U-shaped stop member 27 having one long leg 28 secured to the face of the gear and a short leg 29 terminating short of said face. Disposed also on the face of the gear 18 and offset angularly a short distance from the leg 29 of the stop 27 is a stop 30 terminating short of the inner end of the leg 29. The spring arm 22 has an extension 31 which is adapted to be projected into the path of the stops 29 and 30 as will be more fully hereinafter described.

Positioned adjacent the shutter is an adjustable diaphragm 32 which is preferably an improved form of the iris type of diaphragm having a plurality of overlapping leaves 33 which are simultaneously movable to vary the size of the diaphragm opening. As shown this diaphragm comprises a base plate 34 having a series of circularly arranged pins 35 secured therein and disposed parallel to the base plate and supported a short distance therefrom so as to provide space for the diaphragm leaves is an annular plate 36 having a series of elongated curved slots 37 in which the pins 35 are respectively adapted to project, the plate being guided in angular movement thereby. Also arranged in said plate 36 is a series of radially disposed slots 38 corresponding in number to the diaphragm leaves and being evenly spaced around the plate. Each diaphragm leaf 33 is pivotally supported near one end on one of the pins 35 and carries intermediate its ends a short pin 39 which extends into one of the slots 38. The plate 36 may be held in spaced relationship with the base plate by integral curved projecting guides 40 on the base plate which engage the edges of the latter, the guides having shoulders 41 extending under the edges of the plate so as to give the plates the required spacing. It will thus be seen that any movement of the plate 36 relative to the base plate will cause the diaphragm leaves to move to open or close the diaphragm opening.

Figure 3:
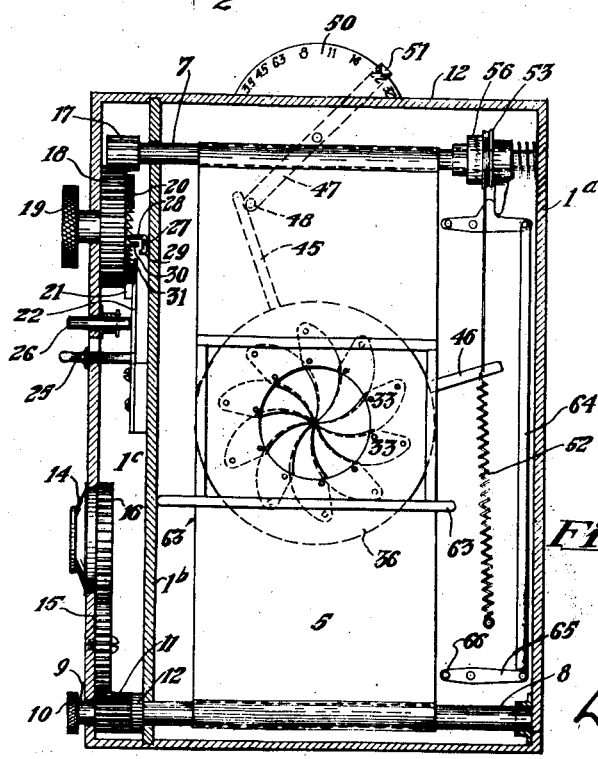
Fig. 3 is a view similar to Fig. 2, the parts being shown in different operative relationship.
Figure 6:
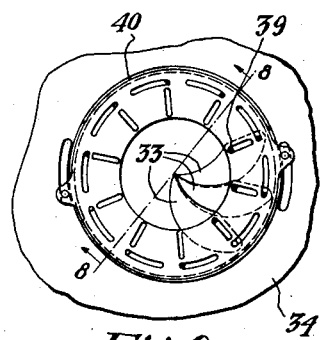
Figs. 6 and 7 are detailed views of the diaphragm.
Figure 7:
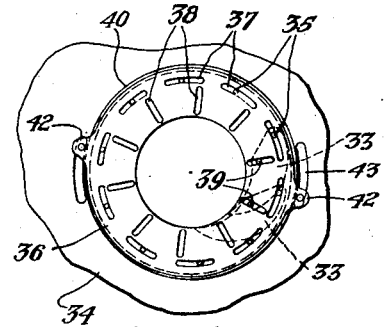
Figure 8:
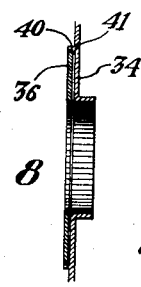
Fig. 8 is a detail sectional view taken approximately on the line 8—8 of Fig. 6 looking in the direction of the arrows.

As shown in Figs. 6 and 7 lugs 42 are provided on the periphery of the movable plate 36 and connections extend through slots 43 in the base plate to communicate with operating mechanism comprising a ring 44 surrounding the barrel of lens member 3 and a radially projecting arm 45 secured thereto. As shown in Figs. 2 and 3, a second radial arm 46 is operatively connected to the movable plate 36 for a purpose which will presently be described. In order to set the diaphragm to the required opening a pivoted lever 47 carries a pin 48 at one end which is adapted to engage the arm 45 and at its opposite end an angularly disposed portion 49 frictionally engages the curved edge of a plate 50 to hold the lever in adjusted position. The angularly disposed portion of the lever carries an index 51 which is adapted to pass over a scale engraved on the plate 50 giving an indication of the diaphragm opening. A coil spring 52 is connected to the arm 46 and is tensioned to urge the diaphragm toward closed position.

In order to prevent the passage of light into the camera as the slit in the shutter passes the diaphragm in its setting movement, connecting means are provided to close the diaphragm as the shutter is being set and to open the same when the slit has passed the diaphragm opening. This connection comprises a drum 53 loosely mounted to rotate and to slide longitudinally on the roller 7 and having serrations 54 on one side thereof which are adapted to engage similar serrations 55 on a collar 56 also mounted on the roller 7. The drum 53 is connected to the diaphragm arm 46 by means of a flexible member 53 connected at one end to the arm and adapted to wind upon the drum as the latter is rotated with the roller 7. The collar 56 frictionally engages roller 7 so as to rotate therewith but is adapted to slip thereon if the resistance exerted on the drum exceeds a certain maximum. A collar 57 is slidably mounted on the roller 7 having a projecting arm 58 thereon and being urged by coil spring 59 to engage the drum 53 and to move the latter toward collar 56. Pivotally mounted adjacent the arm 58 is a lever 60 having a laterally projecting arm 61 which is adapted to engage the arm 58. The upper end of said lever has a pin 62 lying in the path of movement of a cross piece 63 which is secured in position on the curtain, the lower end of the lever being connected by link 64 to a similar pivoted lever 65 positioned near the roller 8 and having a pin 66 lying in the path of movement of the cross-piece 63. As shown the cross-piece may extend across the curtain and be provided with an extension 63′ which engages the partition 1^b to guide the shutter in its movement.

Figure 4:
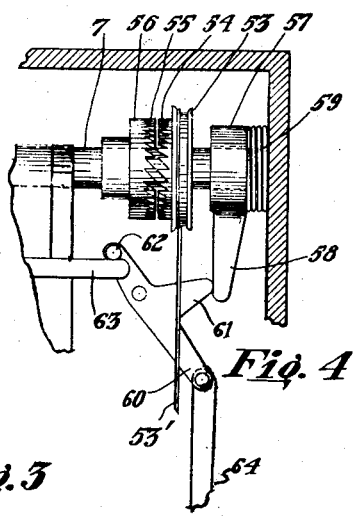
Fig. 4 is a detail fragmentary sectional view showing means for tripping the diaphragm closing means.

The operation of the device is a follows: Assuming the parts in the position as shown in Fig. 2, the operator turns the nurled winding head 19 to the left as indicated by the arrow, which movement, through gears 17 and 18, causes the roller 7 to turn to the right to wind the curtain thereon against the tension of the spring pressed roller 8, the spring pressed pawl 21 riding over the inclined teeth 20 on the gear 18 and holding the curtain in adjusted position. The drum 53 being in engagement with the collar 56 is caused to rotate with the latter, winding the flexible member 53′ thereon and closing the diaphragm by movement of the arm 46. It will be noted that the diameter of the drum 53 is considerably greater than that of the roller 7 so the flexible connection 53′ is moved much more rapidly than the curtain, the consequence being that the diaphragm is quickly closed before the slit 6 in the curtain is moved adjacent thereto. The diaphragm being tightly closed by this means the slit passes by the same without the passage of any light rays to the interior of the camera. After the diaphragm has been completely closed by the operation just described, the roller 7 is permitted to continue its movement by reason of the fact that the collar 56, frictionally engaging said roller, slips thereon as the tension of the flexible member 53′ increases when the diaphragm reaches closed position, the drum then remaining stationary until the shutter reaches approximately full set position. When the shutter nears the end of its setting movement the cross-piece 63 contacts with the pin 62 on the lever 60 moving the latter to slide the collar 57, through cooperating parts 61 and 58, against the resistance of the spring 59 disengaging the serrations on the drum with those on the collar, as particularly shown in Fig. 4.

The collar 57 and lever 60 are locked in this position due to the fact that the line of stress of the spring 59 is exerted through the arms 58, 61 and the pivotal point of lever 60, there being therefore practically no tendency to rotate said lever in either direction. The diphragm is then moved toward open position under the influence of the spring 52 until the arm 45 engages the stop 48 to limit its opening movement.

The shutter is now in position to make an exposure. If it is desired to make an instantaneous exposure the sliding spring arm 22 is allowed to remain in the position shown in Fig. 2 while the pin 26 is pressed to release the pawl 21 from the teeth 20 whereupon the curtain moves under the influence of spring roller 8 to carry the slit quickly past the diaphragm and lens. As the shutter reaches the extreme position after exposure the cross-piece 63 contacts with the pin 66 moving lever 65 to trip the lever 66 thereby allowing the collar 57 to move under the influence of the spring 59 to re-engage the drum with the collar 56.

If it is desired to make a "bulb" exposure, that is, to open the shutter when the pin 26 is pressed and to close the same when pressure is released, the spring arm 22 is projected longitudinally by means of sliding pin 25 until it registers with the symbol "B" of the scale shown in Figs. 1 and 5. The projection 31 on the spring arm is thus moved into the path of the stop 29, and as the curtain unwinds from the roller 7, the releasing pin and spring arm being pressed inwardly, said stop engages said projection arresting the curtain when the slit is adjacent the diaphragm. When the pressure is released on the pin the spring arm moves to disengage the stop 29, the curtain continues its movement, and the exposure is thus completed.

To make a "time" exposure, the spring arm is moved until position "T" is indicated on the scale projection 31 being thereby moved into the path of both stops 29 and 30. When the arm 22 is pressed inwardly the projection engages the stop 29, as in the case of a "bulb" exposure but when the pressure is released the arm moves outwardly and engages the stop 30, there being a slight movement on such release due to the angular displacement of stop 30 with respect to stop 29. The shutter is thus held in open position until the arm is again pressed inwardly to disengage the projection thereof with stop 30 whereupon the shutter moves to closed position under the influence of the spring roller 8. The speed of movement of the curtain is easily varied by adjusting the spring tension of roller 8 by means of the nurled head 10.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is—

1. In an optical instrument, in combination, a lens for said instrument having a plurality of elements, a curtain shutter disposed between adjacent elements of said lens, winding mechanism for setting said shutter, a diaphragm also disposed between said lens elements, and means for closing said diaphragm when said shutter is being set.

2. In combination, a lens having a plurality of elements, a curtain shutter disposed between adjacent elements of said lens, means for setting said shutter, a diaphragm adjacent to said shutter, and means for automatically closing said diaphragm when said shutter is being set.

3. In combination, a lens having a plurality of elements, a curtain shutter disposed between adjacent elements of said lens, means for setting said shutter, a diaphragm adjacent to said shutter, and means for automatically closing said diaphragm when said shutter is being set and for subsequently opening the same.

4. In combination, a curtain shutter, means for setting said shutter, a diaphragm adjacent said shutter, and means for automatically closing said diaphragm when said shutter is being set.

5. In an optical instrument, in combination, a curtain shutter having a slit therein, means for setting said shutter, automatic means controlled by said setting means to shut off light from the shutter when the latter is being set, and independent means for controlling said automatic means to vary the amount of light admitted by said shutter.

6. In a camera, in combination, a curtain shutter, means for setting said shutter, a diaphragm adjacent said shutter, means including a clutch for automatically closing said diaphragm when said shutter is being set, and means for releasing said clutch to permit said diaphragm to open.

7. In a camera, in combination, a curtain shutter, means for setting said shutter, a diaphragm adjacent said shutter, means for adjusting the aperture in said diaphragm, and means for automatically closing said diaphragm when said shutter is being set.

8. In a camera, in combination, a curtain shutter, means for setting said shutter, a diaphragm adjacent said shutter, means for adjusting the aperture in said diaphragm, and means for automatically closing said diaphragm when said shutter is being closed and for subsequently returning the same to adjusted position.

9. In a camera, in combination, a curtain shutter wound at one end on a spring pressed roller and at the other end on a second roller, means for winding said shutter to set position onto said second roller against the tension of said spring pressed roller, said means including a toothed rotary member, stops on said member, and a pawl engaging said teeth to hold the curtain in set position and cooperating with said stops to determine the character of exposure.

10. In a camera, in combination, a shutter, setting and releasing means for said shutter, said means including an angularly movable element, a plurality of stops on said element, a member adapted to hold said shutter in set position, and means whereby said member is adapted to engage one or more of said stops to vary the character of exposure.

11. In a camera, in combination, a shutter, setting and releasing means for said shutter, said means including an angularly movable element, a substantially U-shaped stop on said element, and a bodily movable member adapted to engage said stop to control the character of exposure.

12. In a camera, in combination, a shutter, setting and releasing means for said shutter, said means including an angularly movable element, a plurality of stops on said element, one being substantially U-shaped, and adjustable means for engaging said U-shaped stop to provide one character of exposure, and another of said stops to provide another character of exposure.

13. In a camera, in combination, a shutter, setting and releasing means for said shutter, said means including an angularly movable element, a plurality of stops on said element, one being substantially U-shaped, and adjustable means for engaging said U-shaped stop to provide one character of exposure, and another of said stops to provide another character of exposure, said adjustable means being adapted to engage said angularly movable element to hold the shutter in set position.

14. In a camera, in combination, a shutter, setting and releasing means for said shutter, said means including an angularly movable element, a plurality of stops on said element, one being substantially U-shaped, and adjustable means for engaging said U-shaped stop to provide one character of exposure, and another of said stops to provide another character of exposure, said adjustable means comprising a spring pressed pawl which is adapted to engage teeth on said angularly movable element to hold the shutter in said position.

15. In a camera, in combination, a curtain shutter having a slit therein, a roller for said shutter, means for moving said roller to set the shutter and for holding the same there, a diaphragm adjacent said shutter, and a connection between said roller and said diaphragm to close the latter when the shutter is being set.

16. In a camera, in combination, a curtain shutter having a slit therein, a roller for said shutter, means for moving said roller to set the shutter and for holding the same there, a diaphragm adjacent said shutter, a connection between said roller and said diaphragm to close the latter when the shutter is being set, and automatic means for restoring said diaphragm to original position.

17. In a camera, in combination, a curtain shutter having a slit therein, a roller for said shutter, means for moving said roller to set the shutter and for holding the same there, a diaphragm adjacent said shutter, a connection between said roller and said diaphragm to close the latter when the shutter is being set, and automatic means controlled by the setting movement of said shutter for restoring said diaphragm to original position.

18. In a camera, in combination, a curtain shutter having a slit therein, a roller for said shutter, means for moving said roller to set the shutter and for holding the same there, a diaphragm adjacent said shutter, and means for closing said diaphragm when said shutter is being moved to set position, a small movement of said shutter being accompanied by a relatively large movement of said diaphragm.

19. In a camera, in combination, a curtain shutter having a slit therein, a roller for said shutter, means for moving said roller to set the shutter and for holding the same there, a diaphragm adjacent said shutter, means for closing said diaphragm when said shutter is being moved to set position, a small movement of said shutter being accompanied by a relatively large movement of said diaphragm for permitting the shutter to continue its setting movement after said diaphragm is closed, and automatic means controlled by the setting movement of said shutter for restoring said diaphragm to original position.

20. In a camera, in combination, a curtain shutter having a slit therein, a roller for said shutter, means for moving said roller to set the shutter and for holding the same there, a diaphragm adjacent said shutter, and a lost motion connection between said roller and said diaphragm.

21. In a camera, in combination, a curtain shutter having a slit therein, a roller for said shutter, means for moving said roller to set the shutter and for holding the same there, a diaphragm adjacent said shutter, a lost motion connection between said roller and said diaphragm, and automatic means for restoring said diaphragm to original position after having been operated through said connection.

22. In a camera, in combination, a curtain shutter having a slit therein, a roller for said shutter, means for moving said roller to set the shutter and for holding the same there, a diaphragm adjacent said shutter, a drum on said roller, a collar adjacent said drum adapted to engage and drive the same, and a connection between said drum and said diaphragm.

23. In a camera, in combination, a curtain shutter having an opening therein, a roller for said shutter, means for moving said roller to set the shutter and for holding the same there, a diaphragm adjacent said shutter, a drum on said roller, a collar adjacent said drum adapted to engage and drive the same, a connection between said drum and said diaphragm, and resilient means for holding said drum in engagement with said collar.

24. In a camera, in combination, a curtain shutter having a slit opening therein, a roller for said shutter, means for moving said roller to set the shutter and for holding the same there, a diaphragm adjacent said shutter, a drum on said roller, a collar adjacent said drum adapted to engage and drive the same, a connection between said drum and said diaphragm, and means operated by said shutter for rendering said last mentioned means ineffective.

25. In a camera, in combination, a curtain shutter having a slit therein, a roller for said shutter, means for moving said roller to set the shutter and for holding the same there, a diaphragm adjacent said shutter, and a yielding connection between said roller and said diaphragm.

26. In a camera, in combination, a shutter, a diaphragm adjacent said shutter, lost motion connections between said shutter and said diaphragm for operating the latter in one direction, and means operatively associated with said shutter for operating said diaphragm in another direction.

27. In a camera, in combination, a shutter, a diaphragm adjacent said shutter, means connected to said shutter for closing said diaphragm, and means for rendering said first means ineffective whereby said diaphragm is permitted to move toward open position.

28. In a camera, in combination, a shutter, a diaphragm adjacent said shutter normally biased to closed position, means connected to said shutter for closing said diaphragm, and means operated by a predetermined point in the movement of said shutter whereby said diaphragm is permitted to move toward open position under the influence of its bias.

29. In a camera, in combination, a shutter, a diaphragm adjacent said shutter, means including a clutch connected to said shutter for closing said diaphragm, and means dependent upon the movement of the shutter whereby said clutch is released to permit said diaphragm to move toward open position.

30. In a camera, in combination, a shutter, a diaphragm adjacent said shutter, means connected to said shutter for closing said diaphragm, means for rendering said first mentioned means ineffective whereby said diaphragm is permitted to move toward open position, and means for restoring said second mentioned means to normal condition upon completion of an exposure.

31. In a camera, in combination, a shutter, a diaphragm adjacent said shutter, means including a clutch connected to said shutter for closing said diaphragm, means dependent upon the movement of the shutter whereby said clutch is released to permit said diaphragm to move toward open position, and means for restoring said clutch to normal condition upon completion of an exposure.

32. In a camera, in combination, a shutter, a diaphragm, means for closing said diaphragm while said shutter is being set, means for rendering said first mentioned means ineffective as said shutter nears set position, and means for restoring said first means to normal condition upon completion of an exposure.

33. In a camera, in combination, a shutter, a diaphragm, a member operatively connected to said shutter, a member yieldingly held in driven engagement with said first mentioned member and connected to said diaphragm whereby the latter is closed when said shutter is moved toward set position, means normally urging said diaphragm toward open position, and means whereby said members are disengaged as the shutter nears set position and said diaphragm moved toward open position under the influence of said first mentioned means.

34. In a camera, in combination, a shutter, a diaphragm, a member operatively connected to said shutter, a member yieldingly held in driven engagement with said first member and connected to said diaphragm whereby the latter is closed when said shutter is moved toward set position, means normally urging said diaphragm toward open position, means whereby said members are disengaged as the shutter nears set position and said diaphragm moved toward open position under the influence of said first mentioned means, and means to re-engage said members upon completion of an exposure.

In testimony whereof I affix my signature, in the presence of two witnesses.

HOWARD A. WHITESIDE.

Witnesses:
C. W. WEEKS,
M. A. CASKIN.